United States Patent
Ying et al.

(10) Patent No.: US 12,206,187 B2
(45) Date of Patent: Jan. 21, 2025

(54) ANTENNA DEVICE FOR WIRELESS POSITIONING

(71) Applicant: SONY GROUP CORPORATION, Tokyo (JP)

(72) Inventors: Zhinong Ying, Lund (SE); Marc Ahlse, Bjärred (SE); Henrik Landahl, Löddeköpinge (SE)

(73) Assignee: Sony Group Corporation, Tokyo (JP)

( * ) Notice: Subject to any disclaimer, the term of this patent is extended or adjusted under 35 U.S.C. 154(b) by 657 days.

(21) Appl. No.: 17/325,962

(22) Filed: May 20, 2021

(65) Prior Publication Data

US 2021/0399425 A1 Dec. 23, 2021

(30) Foreign Application Priority Data

Jun. 18, 2020 (SE) .................................. 2050731-5

(51) Int. Cl.
| | |
|---|---|
| *H04W 4/02* | (2018.01) |
| *G01S 5/02* | (2010.01) |
| *G01S 5/04* | (2006.01) |
| *H01Q 1/00* | (2006.01) |
| *H01Q 1/48* | (2006.01) |
| *H01Q 9/04* | (2006.01) |
| *H01Q 19/10* | (2006.01) |
| *H04W 64/00* | (2009.01) |

(52) U.S. Cl.
CPC ......... *H01Q 9/0428* (2013.01); *G01S 5/0221* (2013.01); *G01S 5/04* (2013.01); *H01Q 1/007* (2013.01); *H01Q 1/48* (2013.01); *H01Q 19/10* (2013.01)

(58) Field of Classification Search
CPC ........ H01Q 9/0428; H01Q 1/007; H01Q 1/48; H01Q 19/10; G01S 5/0221; G01S 5/04
See application file for complete search history.

(56) References Cited

U.S. PATENT DOCUMENTS

| | | |
|---|---|---|
| 4,841,304 A | 6/1989 | Richard et al. |
| 10,531,299 B1 | 1/2020 | Osborn |
| 2003/0193437 A1 | 10/2003 | Kangasvieri et al. |

(Continued)

FOREIGN PATENT DOCUMENTS

| | | | |
|---|---|---|---|
| CN | 109950705 A | 6/2019 | |
| KR | 101443143 B1 | 9/2014 | |
| WO | WO-2014174858 A1 * | 10/2014 | ............. H01Q 21/20 |

OTHER PUBLICATIONS

Swedish Search Report from corresponding Swedish Application No. 2050731-5, mailed on Feb. 18, 2021, 3 pages.

(Continued)

*Primary Examiner* — Moustapha Diaby
(74) *Attorney, Agent, or Firm* — Tucker Ellis LLP (57) ABSTRACT

An antenna device configured for wireless positioning. The antenna device includes a ground plane having a polygonal shape comprising at least 4 side edges. A plurality of chip antenna elements tuned to a predetermined radio frequency are each singly provided at one of said side edges with a spacing between adjacent ones of said chip antenna elements corresponding to ½ of a wavelength of said predetermined radio frequency. A patch antenna element tuned to said predetermined radio frequency is provided at a center portion of a front side of the ground plane.

18 Claims, 5 Drawing Sheets

---

41. DETECT RADIO FREQUENCY CHARACTERISTICS USING PATCH ANTENNA ELEMENT AND TWO ADJACENT CHIP ANTENNA ELEMENTS

42. DETERMINE POSITION PARAMETER OF AN ORIGIN OF SAID WIRELESS SIGNAL BY TRIANGULATION OF THE WIRELESS SIGNAL (56) References Cited

U.S. PATENT DOCUMENTS

| | | |
|---|---|---|
| 2009/0028225 A1 | 1/2009 | Runyon et al. |
| 2013/0222113 A1* | 8/2013 | Jaffri .................. H01Q 19/10 |
| | | 343/767 |
| 2014/0378165 A1 | 12/2014 | Jajoo |
| 2016/0006131 A1* | 1/2016 | Matsumura ............ H01L 23/66 |
| | | 343/834 |
| 2016/0008662 A1 | 1/2016 | Cronin |
| 2017/0315228 A1 | 11/2017 | Rhead |
| 2018/0294567 A1* | 10/2018 | O'Brien ............... H01Q 13/206 |
| 2020/0212599 A1* | 7/2020 | Liang .................... H01Q 21/28 |
| 2023/0179237 A1* | 6/2023 | Torres ..................... H04B 1/02 |
| | | 455/552.1 |

OTHER PUBLICATIONS

European Search Report from corresponding European Application No. 21176942, mailed on Nov. 12, 2021, 12 pages.

\* cited by examiner

ANTENNA DEVICE FOR WIRELESS POSITIONING

RELATED APPLICATION DATA

This application claims the benefit of Swedish Patent Application No. 2050731-5, filed Jun. 18, 2020, the disclosure of which is incorporated herein by reference in its entirety.

TECHNICAL FIELD

This disclosure relates to the field of antennae for detection of wireless signals, configured to be used for wireless positioning. Specifically, the proposed solutions relate to antenna devices arranged with a plurality of antenna elements, configured for positioning a signal source by triangulation.

BACKGROUND

Electronic devices often include wireless communications circuitry, and such electronic devices may be referred to as wireless terminals. For example, cellular telephones, computers, and other devices often contain antennas and wireless transceivers for supporting wireless communications.

Positioning of electronic devices may be of interest for various reasons. On a general level, positioning may be accomplished by so-called triangulation, or related methods, where a plurality of wireless signals which originate from different source positions are received and processed to obtain a position measurement, based on knowledge of the true position of the sources. Satellite-based positioning, such as GPS (Global Positioning System), has been conveniently used for many years for this purpose. However, such type of positioning is not optimized for in-door use, where building material in walls and ceilings may disturb or eliminate the possibility of obtaining wireless signals originating from satellites. Other related positioning methods are based on signals originating from wireless network base stations of e.g. cellular networks, such as OTDOA (Observed Time Difference of Arrival). Such techniques are typically also mostly usable outdoors, or at least where an undisturbed line-of-sight to the base stations is offered.

For these reasons, indoor positioning systems are of great interest. The principle requires using a wireless signal, such as a Bluetooth signal, to determine an angle of arrival and analyze signal phase and delay to time of arrival in order to determine position information. Such systems usually include many antenna elements, which are switched in quick succession in order to perform the analysis for each antenna element. One state of the art design makes use of an array of CP (Circular Polar) patches provided over a ground plane surface. The space between adjacent antenna elements in a row or column is ½ wavelength of the operating frequency of the signal to be detected for positioning. A drawback of such a design is that coverage is not good at wide angles, i.e. with reference to a normal direction of the ground plane. Another state of the art design is to arrange linear dipoles along the edge of the ground plane. The space between the center of each dipole is ½ wavelength. This has the consequence that the edges of each dipole are close together, which causes interference. Moreover, the ground plane needs to be large, as dipoles are stacked end-to-end along the edges. Such a design typically provides poor coverage, is not good for small angles directly above the ground plane, and the resolution is not good for elevated angles.

There is consequently still a need for improvement in the art of antenna devices configured for positioning, such as for indoor positioning.

SUMMARY

In view of the general objective of providing an antenna solution for use in positioning, an antenna device as outlined in the independent claims is provided. The antenna device comprises a ground plane having a polygonal shape comprising at least 4 side edges; a plurality of chip antenna elements tuned to a predetermined radio frequency, wherein each chip antenna element is singly provided at one of said side edges with a spacing between adjacent ones of said chip antenna elements corresponding to ½ of a wavelength of said predetermined radio frequency; and a patch antenna element tuned to said predetermined radio frequency, provided at a center portion of a front side of the ground plane.

Moreover, a method for positioning using the antenna device comprises:
  detecting radio frequency characteristics of a wireless signal of said wavelength using the patch antenna element and two adjacent ones of said chip antenna elements;
  determining a position parameter of an origin of said wireless signal by triangulation of the wireless signal.

Various examples are outlined in the dependent claims.

BRIEF DESCRIPTION OF THE DRAWINGS

Various examples will be described with reference to the drawings, in which
  FIG. 1A schematically illustrates a top view of an antenna device according to various examples.

DETAILED DESCRIPTION

The invention will be described more fully hereinafter with reference to the accompanying drawings, in which examples of the invention are shown. This invention may, however, be embodied in many different forms and should not be construed as limited to the examples set forth herein; rather, these examples are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Examples of the invention are described herein with reference to schematic illustrations of idealized examples of the invention. As such, variations from the shapes and relative sizes of the illustrations as a result, for example, of manufacturing techniques and/or tolerances, are to be expected. Thus, examples of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Various solutions are presented herein related to improvements in the art of antenna devices configured for use in an electronic devices for obtaining positioning, such as indoor positioning, based on reception of wireless signals. Different examples will be described with reference made to the drawings. According to a general example, an antenna device 1 configured for wireless positioning is provided, comprising:

a ground plane 10 having a polygonal shape comprising at least four side edges 11;

a plurality of chip antenna elements 20 tuned to a predetermined radio frequency, wherein each chip antenna element is singly provided at one of said side edges with a spacing D between adjacent ones of said chip antenna elements corresponding to ½ of a wavelength λ of said predetermined radio frequency; and a patch antenna element 30 tuned to said predetermined radio frequency, provided at a center portion of a front side 12 of the ground plane.

Each chip antenna element 20 will cause excitation of the edge 11 of the ground plane 10 to act as an antenna. In this arrangement, where the chip antenna elements are combined with the patch antenna element 30 provided at the center of the polygon-shaped ground plane, detection of wireless signals from both wide and narrow angles with respect to a normal direction to the ground plane is obtained. The antenna device 1 is thus configured for positioning by triangulation of a received wireless signal at the predetermined radio frequency, using signal detection in at least two adjacent chip antenna elements 20 and in the patch antenna element 30.

Figure 1A:
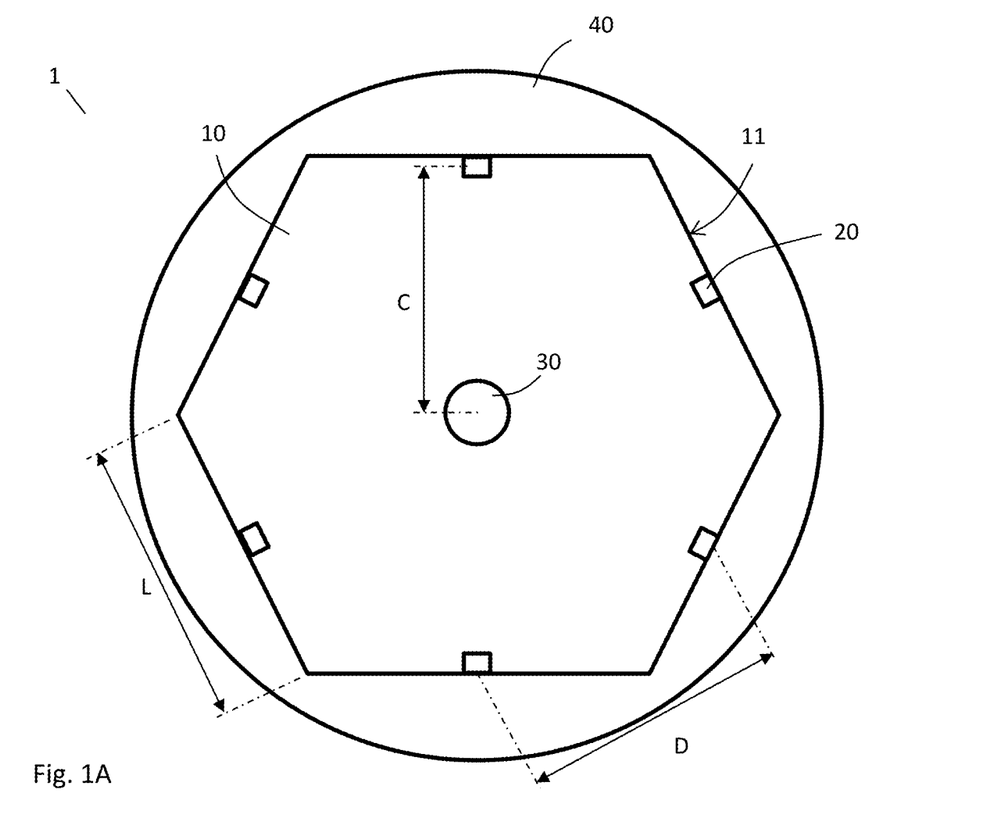
Figure 1B:
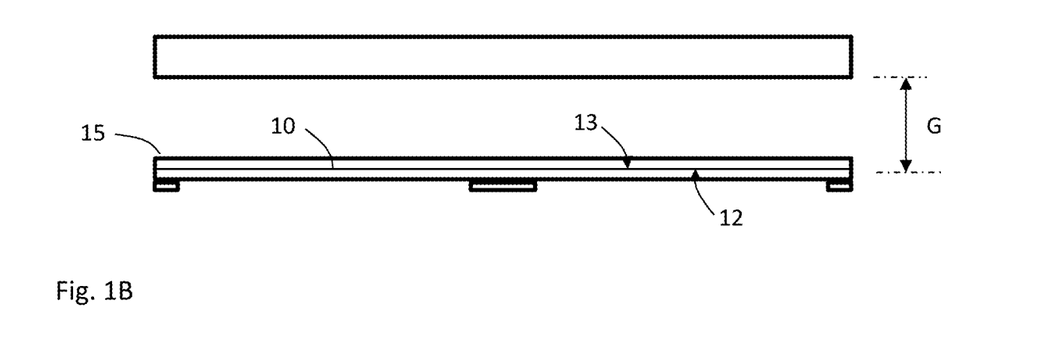
FIG. 1B schematically illustrates the antenna device of FIG. 1A from the side.
Figure 2A:
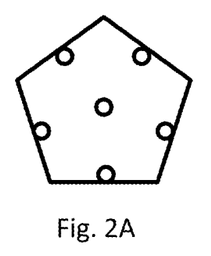
FIGS. 2A through 2E schematically illustrate alternative polygon shapes for a ground plane of the antenna device according to various examples.
Figure 2B:
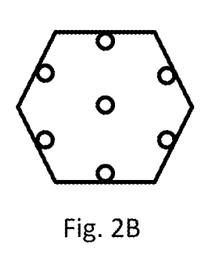
Figure 2C:
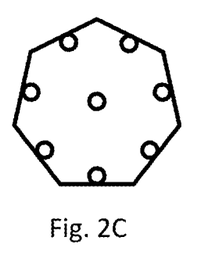
Figure 2D:
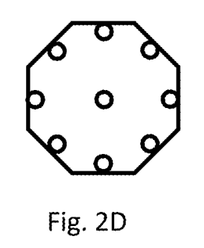
Figure 2E:
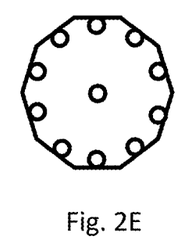

FIGS. 1A and 1B schematically illustrate the antenna device 1 according to one example. In various examples the polygon shape of the ground plane has equally long side edges 11. In the examples shown in the drawings, the side edges 11 are straight. In alternative examples, each side edge 11 of the ground plane is arced.

By way of example, FIGS. 2A-2E schematically illustrate alternative polygonal shapes for the ground plane 10. These examples include polygons having 5-10 sides in FIGS. 2A-2E. With a polygon shape with four sides the antenna pattern could still work. However, if the four-sided shape is squared, the polarization between chip antennas 20 becomes orthogonal since the chip antenna 20 polarity is the same as the edge to which it is attached. This may lead to missed signals from at least one chip antenna 20 in an antenna group. A larger number of sides is beneficial in this aspect. For polygonal shapes with many sides, such as more than 10, the device may comprise more than one center patch antenna element 30 in order to ensure that the distances between antennas 20, 30 are suitable, as will be discussed in more detail below.

Returning to the example of FIGS. 1A and 1B, the ground plane 10 has a hexagonal shape, i.e. it has six side edges 11. It shall be noted that the ground plane 10 may be carried on a carrier substrate 15, here also referred to as a PCB, and may be incorporated as an intermediate layer in the carrier substrate 15. This is schematically illustrated in FIG. 1B. The carrier substrate 15 may itself have a different shape than the ground plane 10.

The plurality of chip antenna elements 20 are tuned to a predetermined radio frequency, at which positioning is to be carried out. The radio frequency may e.g. be a Bluetooth radio frequency, such as ISM band 2.4 GHz, or WLAN signal or other predetermined radio frequency. Each chip antenna element 20 is singly provided at one of said side edges 20, meaning that only one chip antenna element 20 is provided at a respective side edge 11, such as one chip antenna element 20 at each side edge 11 of the ground plane 10 as in the shown example. In various examples, each chip antenna element 20 is provided at a center position of the respective side edge 11.

Figure 3:
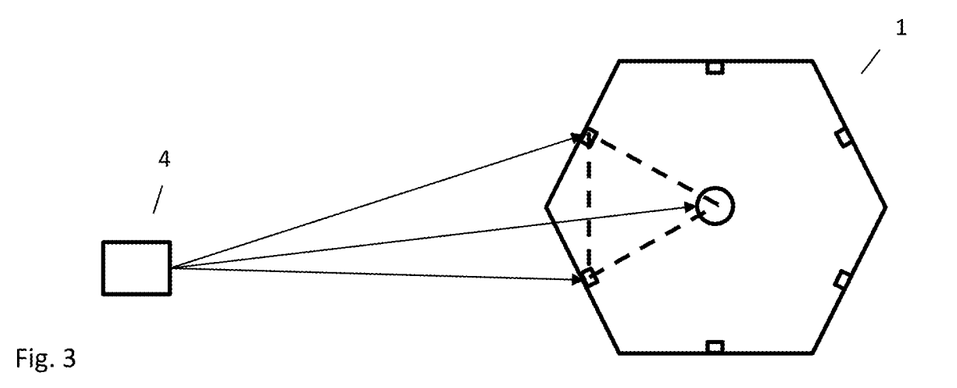
FIG. 3 illustrates positioning by detection of a wireless signal in different antenna elements of the antenna device, according to various examples.
Figure 5:
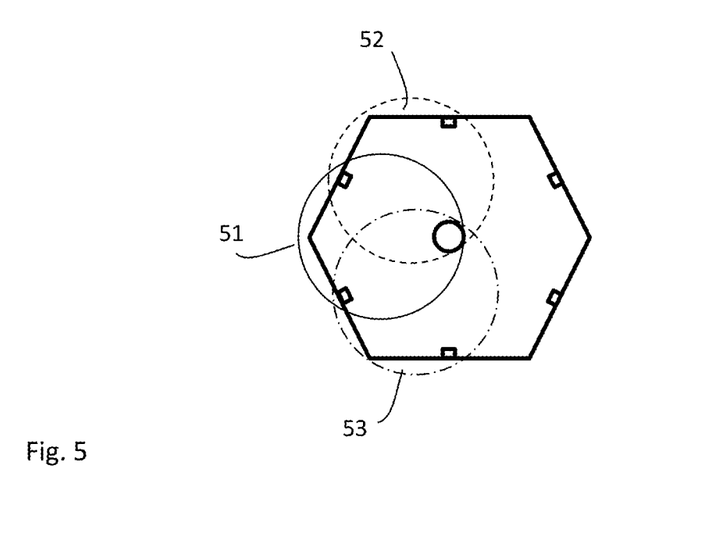
FIG. 5 schematically indicates clusters of antenna elements usable for positioning according to various examples.

In operation of the antenna device 1 for positioning of a signal source, a radio wave will arrive at an antenna array comprising the center patch antenna element 30 and two adjacent chip antenna elements 20 (see also FIG. 3 and group 51 of FIG. 5). When the phase difference of arrival between two different antenna elements of the antenna array is less than +/−90 degrees, the angle of arrival can be accurately calculated. If the phase difference exceeds 90 degrees, accuracy is deteriorated or lost. In combination, the three possible pairwise combinations of the two chip antenna elements 20 and the center patch antenna element 30, forming part of one group 51 of antenna elements, can provide three different directions which together provides a position of the signal source by triangulation. For this reason, a configuration where both the spacing D and the distance C are close to ½ λ, an advantageous arrangement is obtained for triangulation measurements.

In various examples, the spacing D corresponding to ½ λ, of the radio frequency wavelength may involve the spacing D being between ¼ and ¾ of λ. Within this range, the antenna device 1 is capable of detecting phase difference for positioning operation, but closer to ½ λ, will increase performance in triangulation measurement.

In various examples, a distance C between the centrally provided patch antenna element 30 and each chip antenna element 20 also corresponds to said ½ λ, such as between ¼ and ¾ of λ. Within this range, the antenna device is capable of positioning operation, but closer to ½ λ will increase performance in triangulation measurement.

It may be noted that the configuration of the spacing D will also provide an implicit configuration of the distance C, as given by the polygon shape, i.e. the number of sides of the ground plane 10. For a six-sided polygon shape of the ground plane 10 having equally long sides edges 11, i.e. a hexagon, the spacing D will be the same as the distance C as given by the geometry. The hexagonal shape is thus beneficial, since the ground plane may simply be dimensioned based on the frequency of interest, and both C and D may be configured to fulfil the ½ k criteria, within a certain level of tolerance.

As noted, though, proper positioning operation will be obtainable also within certain ranges about the ½ k criteria, as shown by simulations, including shapes that do not provide exactly the same size of C and D. If the distance C from the center patch 30 antenna element to each chip antenna element 20 is ½ λ, then for a pentagon (5-sided) case the spacing D will be about 0.587λ. For a heptagon (7-sided) case the spacing D will be about 0.433λ, and for an octagon (8-sided) case the spacing D will be about 0.382λ. These numbers are thus within a range of 0.4-0.6 of k for the spacing D, given that the center distance C is 0.5 of λ. If, on the other hand, the distance D is configured to be kept at ½ λ, then the distance C will be 0.425λ for a pentagon, 0.57λ for a heptagon, and 0.64λ for an octagon, respectively.

In numerous configurations of the antenna device 1, including the presented examples, the spacing D and the distance C will both be within the range of ¼ and ¾ of λ. Closer to ½ λ will provide better positioning accuracy, but the full range will work. In a configuration where adjacent antenna elements are too close, such as <½ λ, antenna mutual coupling increases to a point where it may cause loss and change the pattern shape, which is harmful to the positioning operation. If the antenna elements are too far apart, e.g. >¾ λ, error in direction determination may result, leading to failed positioning. In various embodiments, dependent on the polygonal shape of the ground plane 10, the relation between the spacing D and the distance C is 0.8≤D/C≤1.2, where closer to 1 is preferred.

The patch antenna element 30 is in various examples a CP (circular polar) patch antenna element or a dual polar (combined signal) type patch antenna element. The patch antenna element 30 is thus polarization independent in various examples. The patch antenna element 30 may be a metal patch printed or adhered above the ground plane 10, such as on a surface of the PCB 15, which dielectrically separates the patch antenna element 30 from the ground plane 10. One or more feeding points (not shown) are provided to connect the patch antenna 30 to radio circuitry. The patch antenna element 30 is, in various examples, a CP antenna which is uniform to all directions.

The spacing D and distance C are in various examples measured from center to center of the respective chip antenna element 20 and patch antenna element 30, such as with respect to a phase center of the respective antenna element 20, 30.

In some examples, each ground plane side edge 11 has a length L corresponding to ½ λ of the radio frequency wavelength to which the antenna elements 20, 30 are tuned. This way, a half wave resonant antenna structure is obtained for each chip antenna element 20, which may enhance the antenna performance. In various examples, the length corresponding to ½ λ of the radio frequency wavelength may involve the side edges having a length L within a certain range to obtain a reasonable resonator effect. This range may be between ¼ and ¾ of said wavelength λ, or even closer such as within 0.4λ to 0.6λ.

In various examples, a reflector surface 40 is provided at a back side 13 of the ground plane 10. In some examples, the reflector surface 40 is arranged parallel to the ground plane 10, spaced apart by a gap G which is less than ¼ of λ. The reflector surface 40 is in various examples larger than the ground plane 10, as illustrated, such that it extends radially from the center of the ground plane 10 beyond each side edge 11 of the ground plane. The reflector surface 40 obtains sharpening of the overall antenna pattern for wide angle detection, tilted to the side compared to the normal direction of the ground plane 10. The reflector surface may be a conductive surface, such as a metal layer or surface.

FIG. 3 schematically illustrates triangulation for positioning of the antenna device 1 with respect to a signal source 4. The angle of arrival is mainly calculated by signal detection from three neighboring antenna elements, as indicated in the drawing, at different angle sectors. Signal delay and phase angle are determined with respect to the at least three antenna elements and are used in an algorithm to determine an angle of arrival and a distance with respect to each antenna element. These are then combined to triangulate the position of the signal source 4 relative to the antenna device 1 to determine a position parameter identifying at least a relative position comprising information on both distance and angle to the signal source 4 with respect to the antenna device 1.

Figure 4A:
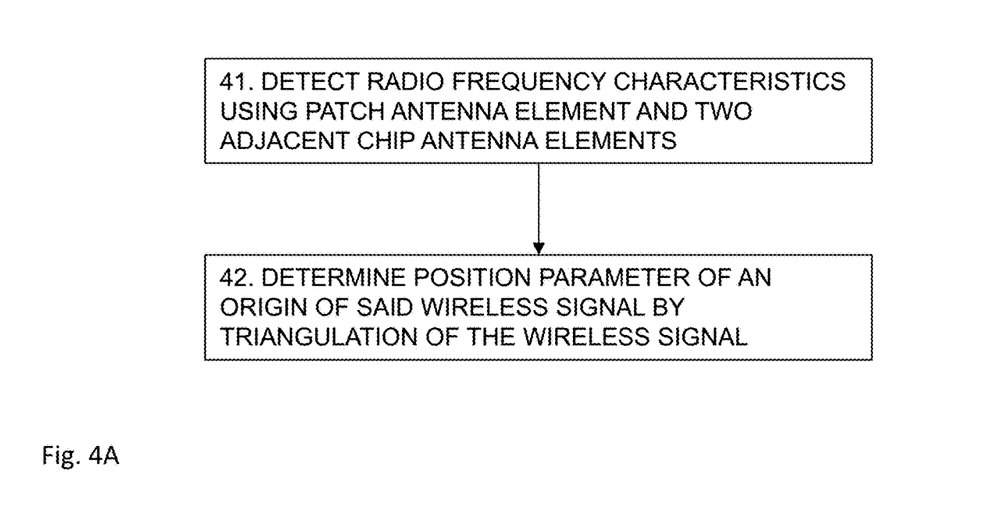
FIG. 4A shows a flow chart of a general method for positioning according to various examples.

FIG. 4A illustrates a method for positioning using the antenna device 1 according to any of the examples presented herein. The method comprises at least the steps of
  detecting radio frequency characteristics of a wireless signal of said wavelength using the patch antenna element 30 and two adjacent ones of the chip antenna elements;
  determining a position parameter of an origin of said wireless signal by triangulation of the wireless signal.

Triangulation techniques are as such well known in the art and will therefore not be described in detail herein. The process of positioning, including triangulation, is in various examples carried out in a control unit 3, forming part of the antenna device 1 or being connected to the antenna device 1 in the electronic device 2. The control unit is connected to feeding points of the chip antenna elements 20 and the patch antenna 30 and comprises radio circuitry for determining radio frequency characteristics of at least phase and time associated with detected radio signals, and to carry out triangulation based on the detected radio signals. The control unit 3 may comprise a processor and data storage configured to hold computer program code for execution by the processor to carry out positioning based on the detected radio signals.

Figure 4B:
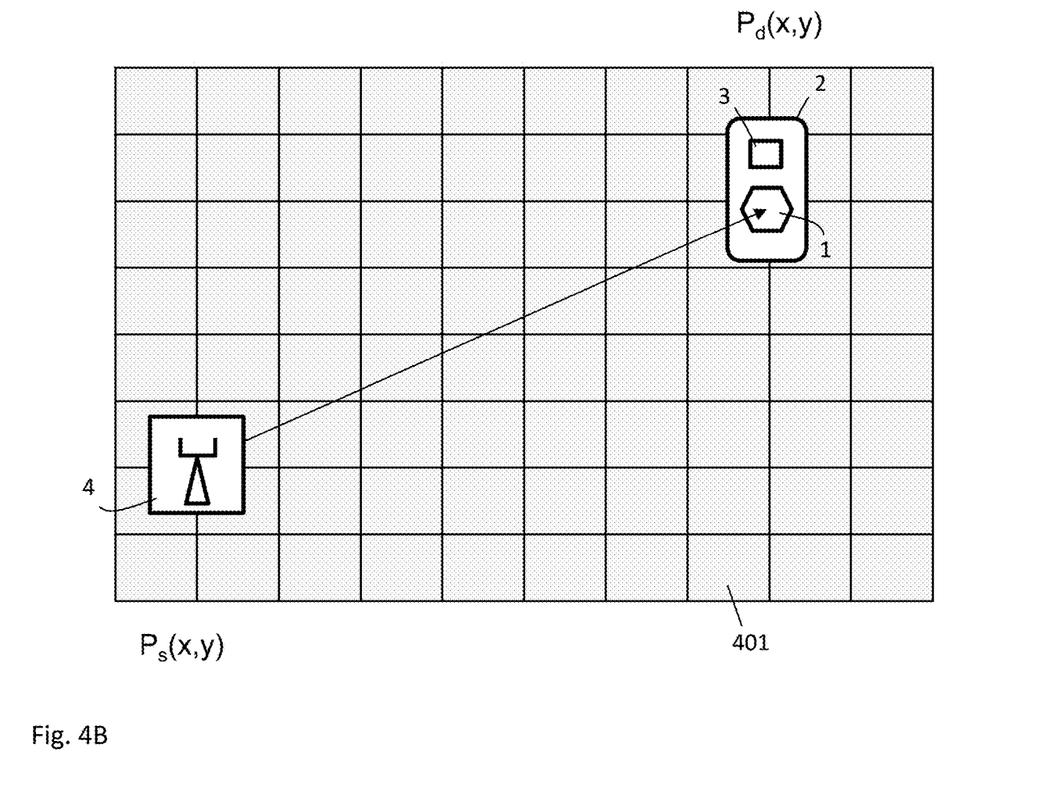
FIG. 4B schematically illustrates positioning of an electronic device comprising the antenna device, with respect to a source position, according to various examples.

FIG. 4B schematically illustrates positioning carried out in an electronic device 2, comprising the antenna device 1 according to any of the examples presented herein. In a scenario where the position $P_s(x,y)$ of the signal source 4 is known, e.g. a geographical position or a position with respect to a local coordinate system 401 or to a map of an area, a determined position parameter identifying a relative position may be used to determine the actual position $P_d(x,y)$ of the antenna device 1, or an electronic device 2 comprising the antenna device 1. Alternatively, where the position of the antenna device 1 is known in a corresponding context, the relative position may be used to determine the actual position $P_s(x,y)$ of the signal source 4, based on the known position $P_d(x,y)$.

FIG. 5 schematically illustrates how close triangle antenna groups 51, 52, 53, indicated by dashed and dash-dotted lines, respectively, may be incorporated in the positioning process by providing further resolution. Each antenna group comprises two adjacent ones of the chip antenna elements 20, and the patch antenna element 30. In such an example, triangulation may be carried out using each of these groups of antenna elements.

The coverage provided by the antenna device 1 of the solutions proposed herein is larger than when using only patch antenna elements or only linear dipoles. Moreover, the PCB 15 carrying the ground plane 10 can be made smaller than in both of those solutions.

Figure 6:
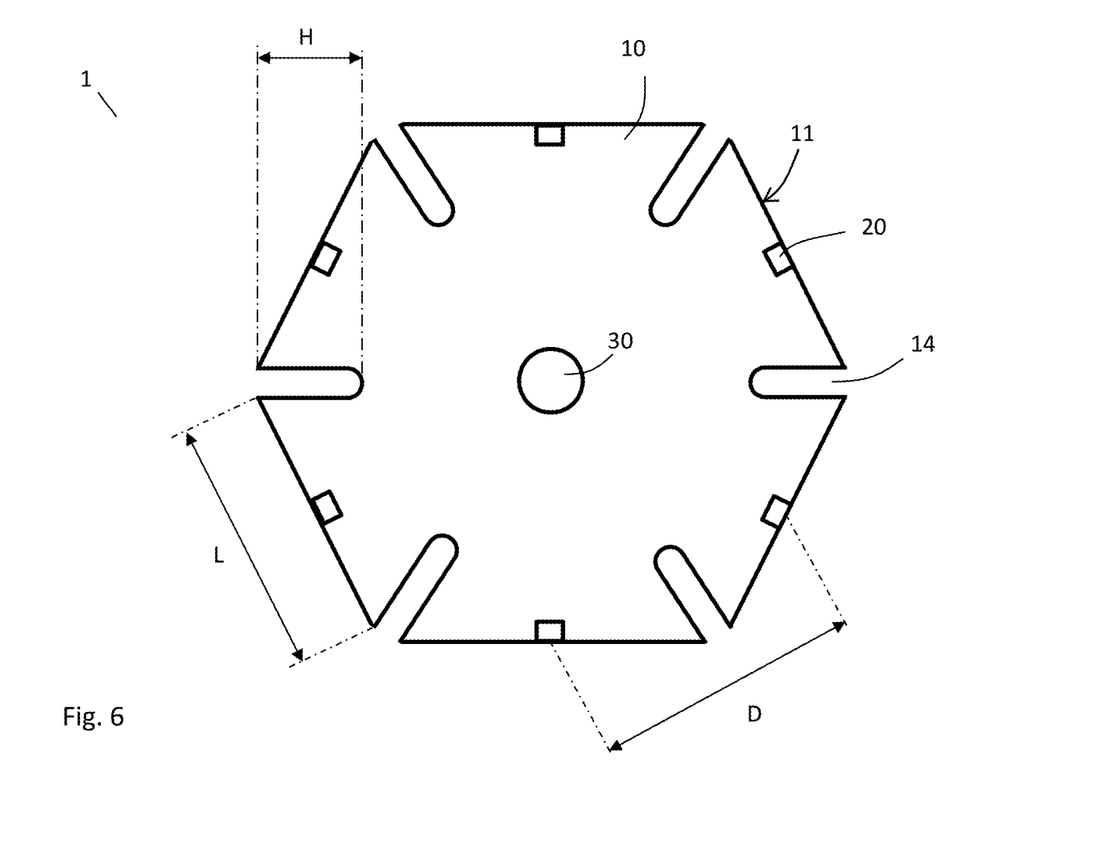
FIG. 6 schematically illustrates an example of the antenna device configured with notches in the ground plane.

In various examples, a notch is formed in the ground plane at each corner or intersection of the side edges of the polygon shape. FIG. 6 schematically illustrates one such example. This example is otherwise similar to the example of FIG. 1, with corresponding features and references used. At each intersection of side edges 11 of the ground plane 10, a notch 14 is formed to separate adjacent side edges 11.

Each notch extends at least partly inwardly, and the shape of the notch 14 shown in FIG. 6 is one example where each notch 14 extends radially inwardly. In some examples, each notch 14 extends a distance H corresponding to ¼ of said predetermined wavelength, within a certain tolerance of e.g. 5%, 10% or 20%. In some examples, each notch 14 extends inwardly to a position which is closer to the patch antenna element 30 than the edge antenna elements 20 are.

Figure 7A:
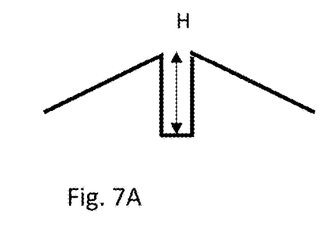
FIGS. 7A through 7C schematically illustrate alternative notch shapes for the example of FIG. 6.
Figure 7B:
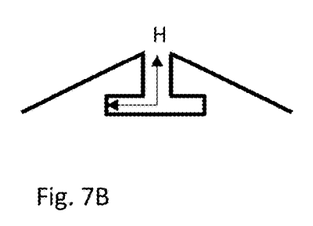
Figure 7C:
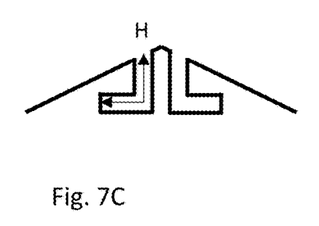

FIGS. 7A-7C illustrate different alternative examples of the notch 14 as such, where FIG. 7A is similar to the example of FIG. 6. In FIG. 7B, a T-shaped notch 14 is shown, having an overall depth H. FIG. 7C shows another example, where two notches 14 are provided as a notch pair, at one intersection of side edges 11 of the ground plane, each notch having a depth H.

One effect of this design of implementing notches 14 is that interference between neighboring chip antenna elements 20 is minimized. The notch provides for low antenna coupling, with a more uniform pattern for each chip antenna which minimizes how much each chip antenna element 20 affects its adjacent chip antenna elements 20.

In some examples, the width of each notch 14 is arranged such that the length L of the side edge 11 correspond to ½ λ. An additional effect obtained by implementing notches to adapt the length L of the side edges to correspond to ½ λ is that the side edge 11 forms a half wave resonant antenna which may enhance the antenna performance.

The use of notches 14 in the ground plane 10 thus provides an extended freedom of design, such that it is possible to arrange both the distance D between adjacent chip antenna elements 20, and the length L of the ground plane side edge 11, to correspond to ½ λ, for instance within a certain tolerance. The tolerance may e.g. be within a range of ¼ to ¾ λ, or a certain percentage, such as less than 5%, 10%, 20% or other.

Figure 8:
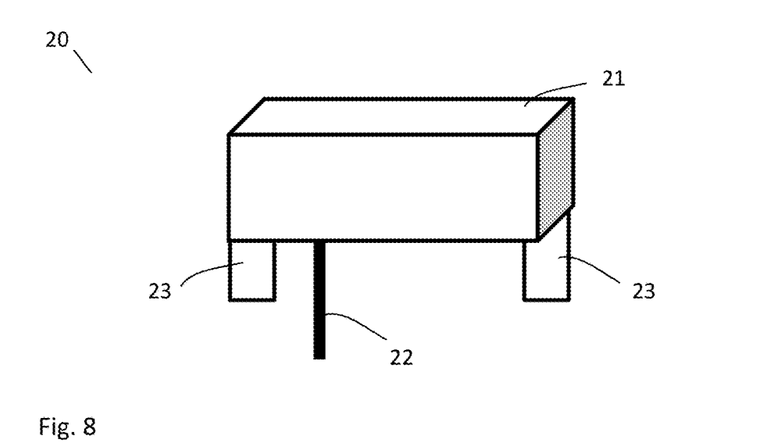
FIG. 8 schematically illustrates a chip antenna configuration usable as an antenna element in the antenna device according to various examples.

FIG. 8 schematically illustrates a chip antenna element 20 usable in any of the examples outlined herein. In some examples, the chip antenna element 20 comprises a dielectric block 21, such as a ceramic, carrying a conductive antenna structure (not shown) such as a monopole or IFA antenna. The dielectric block 21 of the chip antenna element 20 has a high dielectric constant and may have a size in the order of 1-2 mm for use in the range of 2.4 GHz. The antenna structure may be provided by means of a metal trace printed on or otherwise adhered to the dielectric block 21. In the antenna device 1 examples described herein, the chip antenna elements 20 are each connected at each one side edge 11 of the ground plane. A dielectric layer may be configured to separate, or elevate, the chip antenna elements 20 from the actual ground plane 10. This may be accomplished by connecting the chip antenna elements 20 on the PCB 15 over the edges 11 of the ground plane 10. An antenna feed connector 22 is configured to connect to the conductive antenna structure for feeding or signal reception. One or more ground connectors 23 are further provided for connection to the ground plane 10. Normally, ceramic antennas are narrowband. In the examples outlined herein, where the chip antenna elements 20 are located in a half-wave resonant structure (characteristic mode) provided by the ground plane side edge 11 of length L, the chip antenna element 20 provides ample bandwidth and radiation efficiency for reception of wireless signals of the predetermined radio frequency.

The foregoing disclosure presents features and elements of an antenna device 1 usable for positioning based on a received radio signal. Positioning is in various examples carried out by triangulation, based on radio signals received in the antenna elements of one or more antenna groups. Each antenna group may comprise a triangular cluster of antenna elements 20, 30 at one sector part of the antenna device 1.

What is claimed is:

1. An antenna device configured for wireless positioning, comprising:
   a ground plane having a polygonal shape comprising at least 4 side edges;
   a plurality of chip antenna elements tuned to a predetermined radio frequency, wherein each chip antenna element is singly provided at one of said side edges with a spacing between adjacent ones of said chip antenna elements corresponding to ½ of a wavelength of said predetermined radio frequency;
   a patch antenna element tuned to said predetermined radio frequency, provided at a center portion of a front side of the ground plane; and
   a notch formed at each intersection of side edges of the ground plane to separate adjacent side edges of the ground plane, wherein each notch extends a distance corresponding to ¼ of said predetermined wavelength.

2. The antenna device of claim 1, wherein each chip antenna element is provided at a center position of one of side edges.

3. The antenna device of claim 1, wherein each of said side edges has a length corresponding to said ½ wavelength.

4. The antenna device of claim 3, wherein the length of each side edge is between ¼ and ¾ of said wavelength.

5. The antenna device of claim 1, wherein a distance between the patch antenna element and each chip antenna element corresponds to said ½ wavelength.

6. The antenna device of claim 5, wherein the distance is between ¼ and ¾ of said wavelength.

7. The antenna device of claim 1, comprising five to ten side edges.

8. The antenna device of claim 1, wherein a reflector surface is provided at a back side of the ground plane.

9. The antenna device of claim 8, wherein said reflector surface is arranged parallel to the ground plane spaced apart by a gap which is less than ¼ of said wavelength.

10. The antenna device of claim 8, wherein said reflector surface is larger than said ground plane and extends radially from the center of the ground plane beyond each side edge of the ground plane.

11. The antenna device of claim 1, wherein the patch antenna element is a circular polar antenna.

12. An electronic device comprising:
an antenna device configured for wireless positioning, said antenna device comprising:
a ground plane having a polygonal shape comprising at least 4 side edges;
a plurality of chip antenna elements tuned to a predetermined radio frequency, wherein each chip antenna element is singly provided at one of said side edges with a spacing between adjacent ones of said chip antenna elements corresponding to ½ of a wavelength of said predetermined radio frequency;
a patch antenna element tuned to said predetermined radio frequency, provided at a center portion of a front side of the ground plane;
a control unit configured to
detect radio frequency characteristics of a wireless signal of said wavelength using the patch antenna element and two adjacent ones of said chip antenna elements; and
determine a position parameter of an origin of said wireless signal by triangulation of the of the wireless signal.

13. The electronic device of claim 12, wherein each chip antenna element is provided at a center position of one of side edges.

14. The electronic device of claim 12, comprising:
a reflector surface is provided at a back side of the ground plane.

15. The electronic device of claim 14, wherein said reflector surface is arranged parallel to the ground plane spaced apart by a gap which is less than ¼ of said wavelength.

16. The electronic device of claim 14, wherein said reflector surface is larger than said ground plane and extends radially from the center of the ground plane beyond each side edge of the ground plane.

17. The electronic device of claim 12, wherein a notch is formed at each intersection of side edges of the ground plane to separate adjacent side edges of the ground plane.

18. A method for positioning, using an antenna device comprising a polygonal ground plane having at least 4 side edges, a plurality of chip antenna elements singly provided at each of said side edges with a spacing between adjacent chip antenna elements corresponding to ½ of a wavelength of a predetermined radio frequency, and a patch antenna element tuned to said predetermined radio frequency centrally located on a front side of the ground plane, the method comprising:
detecting radio frequency characteristics of a wireless signal of said wavelength using the patch antenna element and two adjacent ones of said chip antenna elements;
determining a position parameter of an origin of said wireless signal by triangulation of the of the wireless signal.

* * * * *